(12) United States Patent
Gaede et al.

(10) Patent No.: US 11,731,373 B2
(45) Date of Patent: Aug. 22, 2023

(54) PRODUCING A PROFILE STRAND

(71) Applicant: Eldisy GmbH, Gardelegen (DE)

(72) Inventors: Daniel Gaede, Asendorf (DE); Stefan Barth, Gardelegen/OT Mieste (DE)

(73) Assignee: Eldisy GmbH, Gardelegen (DE)

( * ) Notice: Subject to any disclaimer, the term of this patent is extended or adjusted under 35 U.S.C. 154(b) by 5 days.

(21) Appl. No.: 17/377,997

(22) Filed: Jul. 16, 2021

(65) Prior Publication Data

US 2022/0040932 A1 Feb. 10, 2022

(30) Foreign Application Priority Data

Jul. 17, 2020 (EP) .................................. 20 186 446

(51) Int. Cl.
| | |
|---|---|
| *B29C 65/00* | (2006.01) |
| *B29C 65/50* | (2006.01) |
| *B29C 65/78* | (2006.01) |
| *B29L 31/00* | (2006.01) |

(52) U.S. Cl.
CPC .............. *B29C 66/90* (2013.01); *B29C 65/50* (2013.01); *B29C 65/7861* (2013.01); *B29C 66/5241* (2013.01); *B29L 2031/006* (2013.01)

(58) Field of Classification Search
CPC ..... B29C 65/50; B29C 65/7861; B29C 66/90; B29C 66/5241
See application file for complete search history.

(56) References Cited

U.S. PATENT DOCUMENTS

| | | | |
|---|---|---|---|
| 2016/0311297 A1* | 10/2016 | Kast ...................... | B23P 19/047 |
| 2019/0016036 A1* | 1/2019 | Krause ................. | B29C 48/0021 |

FOREIGN PATENT DOCUMENTS

| | | |
|---|---|---|
| EP | 1733839 A1 | 12/2006 |
| EP | 2419239 A1 | 2/2012 |
| EP | 3218159 A1 | 9/2017 |
| EP | 3431250 A1 | 1/2019 |

* cited by examiner

*Primary Examiner* — Philip C Tucker
*Assistant Examiner* — Nickolas R Harm
(74) *Attorney, Agent, or Firm* — Bejin Bieneman PLC (57) ABSTRACT

In order to achieve high product quality and process reliability in a process for manufacturing an endless profile strand of soft plastic and/or rubber material fed to a supply storage for a sealing profile, edge protection profile or the like on a motor vehicle, it is provided that the manufacturing process be divided into two process sections which are carried out on two manufacturing lines that can be operated independently of one another.

10 Claims, 4 Drawing Sheets

PRODUCING A PROFILE STRAND

CROSS-REFERENCE TO RELATED APPLICATIONS

This application claims priority to European Application No. 20186446.9, filed on Jul. 17, 2020, which application is hereby incorporated herein by reference in its entirety.

BACKGROUND AND SUMMARY

Disclosed herein is a process for the production of a defect-free continuous profile strand fed to a supply storage from a soft plastic and/or rubber material for further use as a sealing profile, edge protection profile or the like on a motor vehicle. Also disclosed is a manufacturing plant for producing such a profile strand.

Various methods for the production of such profiled strands and production equipment for producing such profiled strands are known from the publications EP 2 419 239 A1, EP 3 218 159 A1, EP 3 431 250 A1 and EP 1 733 839 A1.

The methods described in the prior art deal with the production of endless profile strands to be wound onto rolls at a vehicle supplier (the profile strand manufacturer) and the subsequent processing of the profile strand, which is to be unwound from the roll again at the vehicle manufacturer as an endless strand and cut to length, and its attachment to the motor vehicle. The rolls filled with the profile strand to the vehicle manufacturer represent supply storages in the sense of the disclosure, i.e. devices on which a continuous profile strand of typically several hundred meters to over a thousand meters in length is "stored" by winding in such a way as to enable compact, continuous delivery to the vehicle manufacturer and to ensure that the vehicle manufacturer can easily integrate the supply storage into the manufacturing line to be found at his premises.

The methods described in the prior art focus, among other things, on the separation and/or marking of defects created during the continuous manufacturing process and also on the identification of joints created by the subsequent joining of free ends of adjacent profile strand sections, which were created as a result of the separation of the defects.

Defects are to be understood as manufacturing defects that occur unintentionally during manufacture and have to be removed in the production process at the profile strand manufacturer (surface damage, blowholes, material defects, painting defects, bubbles, "pimples", etc.), while joints are created deliberately by joining two separating ends after the defects have been removed or to form a self-contained profile strand ring after a section of a profile strand has been cut to length. Accordingly, a joint is not to be understood as a defect. When exactly a location is to be classified as a defect to be separated out and is to be separated out of the profile strand by the profile strand manufacturer depends above all on the specifications of the vehicle manufacturer. The specifications may vary depending on the vehicle class (small car, mid-size or luxury class) and the vehicle manufacturer.

The present disclosure is also based on such manufacturing processes carried out by a profile strand manufacturer and on manufacturing equipment located at a profile strand manufacturer.

Despite the specific creation of the joints, the state of the art assumes that in the case of endless profile strands, the joints are separated from an endless strand at the vehicle manufacturer. This is based on the assumption that the joint could impair the function of the profile strand, for example because it could cause leaks, or because its visibility conveys a lower quality impression that is unacceptable to the vehicle purchaser. For the purpose of automated separation of joints at the vehicle manufacturer, provision can be made to mark joints at the profile strand manufacturer—for example with metallic markers or with colored markings—and thus to make them easily identifiable for the equipment used at the vehicle manufacturer.

A disadvantage of the known methods is that these methods still require the vehicle manufacturer to identify joints on the vehicle manufacturing line, since the marked joints are not intended to remain on the profile strand section that is ultimately to be attached to the vehicle, but are to be separated out before final assembly. This means increased production effort for the vehicle manufacturer and necessitates more expensive production technology at the vehicle manufacturer, such as cameras or other devices for detecting joints, as well as separating devices for separating joints and, if necessary, a joining device for rejoining the ends of a profile strand section to be assembled that have been separated.

However, contrary to what has been assumed in the prior art, it may be desirable not to separate out a joint before mounting a sealing strand section on the motor vehicle, but simply to leave it on the profile strand section to be mounted on the vehicle. This enables faster cycle times, lower production complexity and less scrap. In addition, if the process reliability and quality of the joint are adequate, there is largely no need to check a minimum distance to be maintained between two joints or a maximum number of joints in relation to length, and there is no need to detect and separate out a joint before it is attached to the vehicle. However, it is necessary for the joint to be of high quality and, in particular, to be produced in such a way that it is not visually noticeable or is only negligibly noticeable and that it does not threaten to impair the function of the profile strand on the vehicle.

A further challenge in the production and further processing of profile strands still provided with joints is the fact that, as a result of the removal of a defect, an adhesive strip is also cut through, which is applied to the profile strand during production. As a result, however, the profile strand is structurally weakened in the area of the joint.

Against this background, the present disclosure provides a method for manufacturing a profile strand and/or a manufacturing device for manufacturing a profile strand which is capable of providing a visually and/or structurally high quality of joints.

The disclosure is concerned with methods for producing an endless profile strand of soft plastic and/or rubber material fed to a supply storage for use as a sealing profile, edge protection profile or the like on a motor vehicle, the endless profile strand being produced in a continuous process from a starting material and being fed to a supply storage to be delivered to a customer before delivery to the customer. In order to solve the above-mentioned task, it is then provided that the endless profile strand is fed to an intermediate storage during a first process section, the endless profile strand is removed again from the intermediate storage during a second process section downstream of the first process section, wherein during the second process section any defects are cut out of the profile strand and the end-face separating ends are rejoined, creating joints.

and/or an adhesive strip is applied to the profile strand across a joint, and finally the profile strand is fed to the supply storage.

A manufacturing plant to be used for such a process for producing a defect-free profile strand according to the process defined above accordingly provides a first manufacturing line set up as intended for carrying out the first process section and a second manufacturing line set up as intended for carrying out the second process section, wherein the first manufacturing line has an intermediate storage feed device with which the endless profile strand produced on the first manufacturing line is fed as an intermediate product to the intermediate storage, the second manufacturing line has an intermediate storage removal device, by means of which the endless profile strand produced on the first manufacturing line can be removed from the intermediate storage filled on the first manufacturing line, and has a supply storage feed device, by means of which the endless profile strand finished on the second manufacturing line is fed to a supply storage as a final product to be delivered to the customer, and wherein the first manufacturing line and the second manufacturing line are operable independently of each other.

The above-described process and the above-described manufacturing plant make it possible to realize a number of advantages due to the intermediate storage feeding of the endless profile strand initially carried out as the conclusion of a first process section and the removal from the intermediate storage again carried out in a downstream second process section, both process sections preferably being carried out at the profile strand manufacturer.

In particular, dividing up the process makes it possible to distribute various measures in the production of the profile strand, such as the detection, marking and separation of defects, the production of a joint or the application of an adhesive strip, over different process sections in a targeted manner and to better optimize the production equipment to be used for carrying out the manufacturing process for the respective manufacturing steps to be performed in a process section and to be able to operate the second process section, for example, independently of certain conditions or specifications to be complied in the first process section (and vice versa). This concerns, for example, compliance with the optimum extrusion speed to be kept constant without interruption in the first process section, which can then be disregarded in the second process section.

Furthermore, by separating the manufacturing process into two independent process sections on two manufacturing lines that can be operated independently of one another, it is possible to better influence the properties of the material section still being manufactured in a particular manufacturing step. This applies in particular to the instantaneous temperature of the manufactured profile strand during the execution of certain process steps, which is unavoidably high in the first process section due to the extrusion and vulcanization taking place in the first process section. Due to the separation of the process sections, the endless profile strand can be fed to the second process section when the profile strand has cooled down sufficiently. It has been shown that the temperature of the profile strand to be processed can also have a significant influence on the joint quality.

Consequently, it is preferably provided that the first process section is carried out on a first manufacturing device and the second process section is carried out on a second manufacturing device independent of the first manufacturing device. "Independent" in this context means that the first manufacturing device does not interact with the second manufacturing device functionally and/or in terms of time and/or physically and/or in terms of location and/or control.

In particular, it is possible to feed the still defective profile strand to the intermediate storage without first separating out the defects and/or without first applying an adhesive strip, in particular by winding it onto an intermediate spool. The detection and marking of the defects can nevertheless preferably be carried out in the first process section. Preferably, the endless profile strand, which is typically extruded from rubber and/or plastic granules, is therefore still inspected with an inspection device during the first process section and any defects are made identifiable on the profile strand by defect markings, in particular specifically for a detection device used in the second process section.

Furthermore, it has been found to be advantageous in the second process section, while the profiled strand still containing defects is being removed from the intermediate storage device, in particular while the profiled strand is being unwound from the intermediate spool, to identify possible defects and to separate them out of the profiled strand and to join the separating ends produced during separation by means of a joining device.

One advantage of this process separation is that there can be a time offset of, for example, at least 24 hours or even more than a week between carrying out the first process section and carrying out the second process section. The fact that the second process section can basically begin at any time after the first process section makes it possible, for example, to allow the profile strand, which still has defects and is fed to the intermediate storage with defect markings, to cool before preferably defects are cut out, joints are produced and an adhesive strip is applied in the second process section. It has been shown that allowing the profile strand to cool down beforehand enables improved quality of the profile strand, in particular improvement of the joints and of the butt joint transition offset that almost inevitably occurs at the joints, as well as improved supply storage feeding and improved adhesive strip application. In addition, since the endless profile strand is fed at a significantly reduced temperature to the supply storage to be delivered to the vehicle manufacturer, this leads to more stress-free storage of the endless profile strand on the supply storage, in particular if the supply storage is designed as a spool onto which the endless profile strand is wound. Preferably, the profile strand fed to the intermediate storage is allowed to cool down by at least 50% in relation to its temperature in degrees Celsius immediately after completion of the intermediate storage feed, before the profile strand is fed to the second process section by being removed again from the intermediate storage.

Furthermore, the process separation into a first process section and a second process section enables, for example, a profile strand speed and process control in the second process section, which can disregard the extrusion and vulcanization speed of the profile strand being produced, which must always be kept constant in the first process section, in terms of control technology. The speed of the profile strand set in the second process section can be adapted exclusively to the devices used in the second process section, such as a separating device for separating out defects, a joining device for joining junction points created during separation of the defects with creation of a joint, or a device for applying the adhesive strip. The same applies in the first process section, since in the first process section compensating devices for enabling the extrusion speed to be kept constant while simultaneously enabling defect detection, defect separation, joint generation and adhesive strip application become largely dispensable. Overall, therefore, the process separation is accompanied by a considerable simplification of the control of both the first process section and the second process section, which takes into account the speed of the profile strand. More complex compensating devices and compensating controls are largely dispensed with or at least considerably simplified and thus more reliable.

The separation of the process into two independent process sections also enables simplified separation of defects and simplified rejoining of the butt ends created during separation to form a joint while at the same time ensuring a minimum distance $L_{MIN}$ between two joints or a length-related maximum number $Z_{MAX}$ of joints. For this purpose, the second manufacturing line can have a monitoring of a minimum distance specification $L_{MIN}$ of defects and/or of joints and/or a monitoring of a length-related maximum number specification $Z_{MAX}$ of defects and/or of joints.

It is preferably provided that in the second process section at least a partial section of the profile strand section downstream of a separating device for cutting out defects and/or at least a partial section of the profile strand section downstream of a joining device for joining the separating ends produced during separation is stopped at least temporarily (local feed speed is zero) and the profile strand section upstream of the separating device and/or the joining device is fed to the separating device and/or to the joining device in the feed direction.

This advantageous option for guiding the process enables even a longer profile strand section upstream of the separating device and/or the joining device to be continuously diverted from the manufacturing line and fed to disposal, in particular during simultaneous feed. A longer section of profile strand to be disposed of can arise, for example, if a section of profile has, in addition to a first defect, a second defect following it, the distance of which from the first defect is less than $L_{MIN}$ or the separate separation of which would lead to a length-related maximum number $Z_{MAX}$ of joints being exceeded. By means of the described process control, the profile strand section concerned can be diverted in a continuous process before a joint is created and fed to the disposal device. It is not necessary to return the profile strand section downstream of the separating device to the joining device, i.e. in particular to reverse the direction of profile strand conveyance (feed direction) of the profile strand section downstream of the separating device. The process control described above, in particular the tracking of a separating end in the feed direction, and a manufacturing line enabling this process control, are regarded as an independent invention independently of the further features of the process and the manufacturing lines described in this application, in particular independently of the process separation on two manufacturing lines described above as advantageous and independently of whether the measures are carried out on a first manufacturing line or on a second manufacturing line or overall on a single manufacturing line.

In the manufacturing plant, it is advantageously further provided that the first manufacturing line has an inspection device for detecting defects and a device for marking the defects, and the second manufacturing line has a detection device for identifying the defect markings made in the first process section. This considerably simplifies the detection of defects in the second process section or on the second manufacturing line, and significantly simpler detection systems can be used.

The second manufacturing line preferably has an adhesive strip station for applying an adhesive strip to the profile strand, the adhesive strip station being downstream of a joining device for producing a joint in the feed direction. This enables the application of an adhesive strip extending without interruption over a joint.

BRIEF SUMMARY OF THE DRAWINGS

In the following drawings, the disclosure is described according to an exemplarily illustrated process control.

The drawings show.

DESCRIPTION

Figure 1:
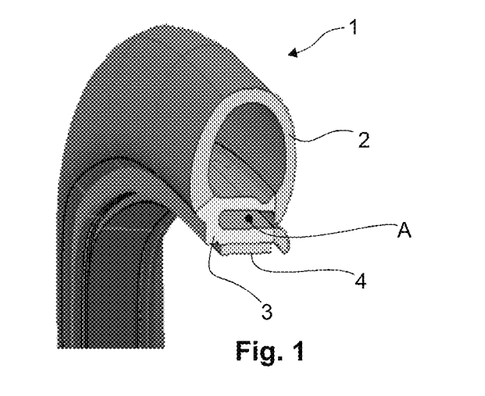
FIG. 1: a profile strand in a perspective view looking at an end parting of a profile strand.

FIG. 1 shows an example of a profile strand 1 typically used as a door seal in a motor vehicle. The profile strand 1 is multi-component and has a first material region 2 made of a (soft) rubber or rubber material (e.g. EPDM) and a second material region 3 made of a soft (rubber) or rubber material (e.g. EPDM). The first material region 2 is highly flexible on the outside due to the material, which is preferably sponge rubber, and the tubular design of the hollow-chamber profile strand cross-section it forms, and is able to fit sealingly against the body portion with which it comes into contact when the door is closed. The second material area 3, which is somewhat stiffer than the first material area 2, forms a U-shaped receiving channel A. The profile strand 1 is attached to the motor vehicle via the second material area 3, in particular by means of an adhesive tape.

The lower, free leg of the U-shaped receiving channel A in FIG. 1 has an adhesive strip 4 on its underside. As can be seen from the illustration in FIG. 2, the adhesive strip 4 has a multi-layer structure with an adhesive layer 5 and a liner 6, which is removed before the profile strand is applied to the body. As can be seen from FIG. 2, the adhesive strip 4 extends without interruption (without itself being interrupted) over a joint V which was created before application of the adhesive strip 4 by cutting out a defective area and rejoining the resulting separating ends. To join the separating ends, a jointing compound 8 was introduced into the joint, by means of which the separating ends were joined materially bonded.

The section of the profile strand shown as an example in FIG. 1 and FIG. 2 can be part of an endless profile strand, such as can be produced by the method explained below.

Figure 3:
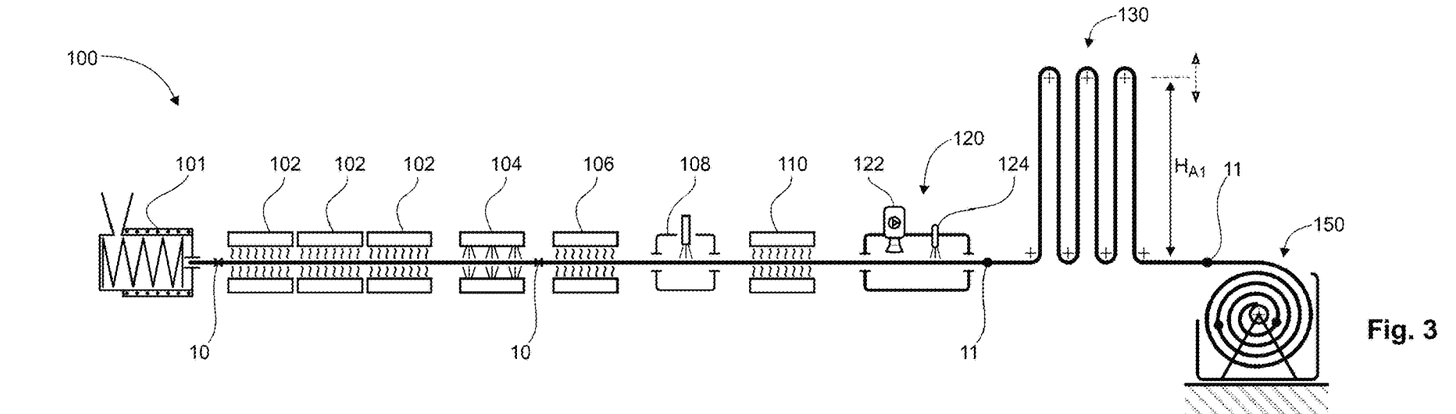
FIG. 3: a first manufacturing line by performing a first process section.

FIG. 3 shows a first manufacturing line 100 on which, starting from a starting material, typically a (soft) rubber (e.g. an EPDM rubber compound and/or another sponge rubber compound) in granular or strip form, an endless profile strand 110 is produced in a continuous process. The starting material is fed to an extruder 101, extruded, heated in multiple stages for through-vulcanization (microwaves 102), cooled (spray cooling 104), dried (drying 106), lacquered with release lacquer (release lacquering device 108) and dried again (lacquer drying 110). The result of this production section is an endless profile strand which has been vulcanized through and lacquered with release lacquer at a temperature which is high due to the process. The exact sequence of the measures described above and the number and arrangement of the devices required for this purpose are shown in FIG. 3 purely by way of example and for explanatory purposes only and are not the actual subject matter of the disclosure.

Following the measures described above, the first manufacturing line 100 shown in FIG. 3 has an inspection device 120 for inspecting the profile strand for any defects. The inspection device 120 preferably comprises an optical, software-supported inspection system with a camera 122, which is capable of independently detecting unmarked defects 10, which are marked with an "x" in FIG. 3, on the basis of software-supported optical monitoring of the endless profile strand moving past the camera 122 in the feed direction S. The camera 122 is then used to check the continuous profile strand for defects 10. If a defect 10 is recognized as a defect to be separated out, it is marked by a marking device 124. Preferably, a colored marking is applied to the profile strand surface in the area of a defect or close in front of or close behind a defect, which marking is visually distinct from the typically black surface of the profile strand. The defect marked in this way becomes a marked defect 11, which is indicated by a "●" in FIG. 3 and FIG. 4.

The first manufacturing line 100 may further comprise a first strand accumulator 130, which is capable of compensating for speed differences before and after the first strand accumulator 130 by varying the effective accumulator height $H_{A1}$. In addition to the effective accumulator height, the line storage capacity of the accumulator is also determined by the number of upper and lower deflection rollers, which in practice are typically arranged on a common axis, unlike in the schematic diagram of FIG. 3. However, in the process according to the disclosure, due to the separation of the process into the two independent process sections shown in FIG. 3 and FIG. 4 and carried out on different manufacturing lines, a strand accumulator is not always necessary in the first process section, since the measures that make strand accumulation in a strand accumulator significantly necessary are preferably carried out in the second process section.

At the end of the first process section, the endless profile strand produced in this process section is preferably fed to an intermediate storage 150 with marked defects that still have to be cut out and without adhesive strips applied. At this point, the profile strand has a high temperature due to the process. The intermediate storage is removed from the first manufacturing line and at a later time fed to the second manufacturing line 200, which is independent of the first manufacturing line 100 in terms of control technology, to carry out the second process section.

FIG. 4 shows in FIG. 4A to FIG. 4F a total of six individual representations of various measures and process stages of the second process section carried out on the second manufacturing line 200, which, due to the separation of the first manufacturing line 100 and the second manufacturing line 200, can be carried out not only in terms of automated process control but also at a location and time separate from the first process section at the profile strand manufacturer.

At the start of the second process section, an intermediate storage 150 filled in the first process section on the first manufacturing line 100 is first fed to the second manufacturing line 200 or the second process section. The profile strand located thereon is subsequently removed from the intermediate storage 150 and guided in the feed direction S past a detection device 210, such as a camera illustrated in FIG. 4A, which is capable of identifying the defect 11 detected and marked in the first process section on the basis of the marking applied in the first process section. The use of a marking applied in the first process section in the second process section has several advantages. In particular, a substantially simplified detection device 210 can be used, which, for example, only has to detect a large-area colored marking that is clearly distinguishable from the surface of the profile strand. Furthermore, such markings can also be seen with the naked eye by a system operator, who can verify the proper functioning of the system by following the color marking with the naked eye and can thus make a significant contribution to process reliability and product quality.

Figure 4A:
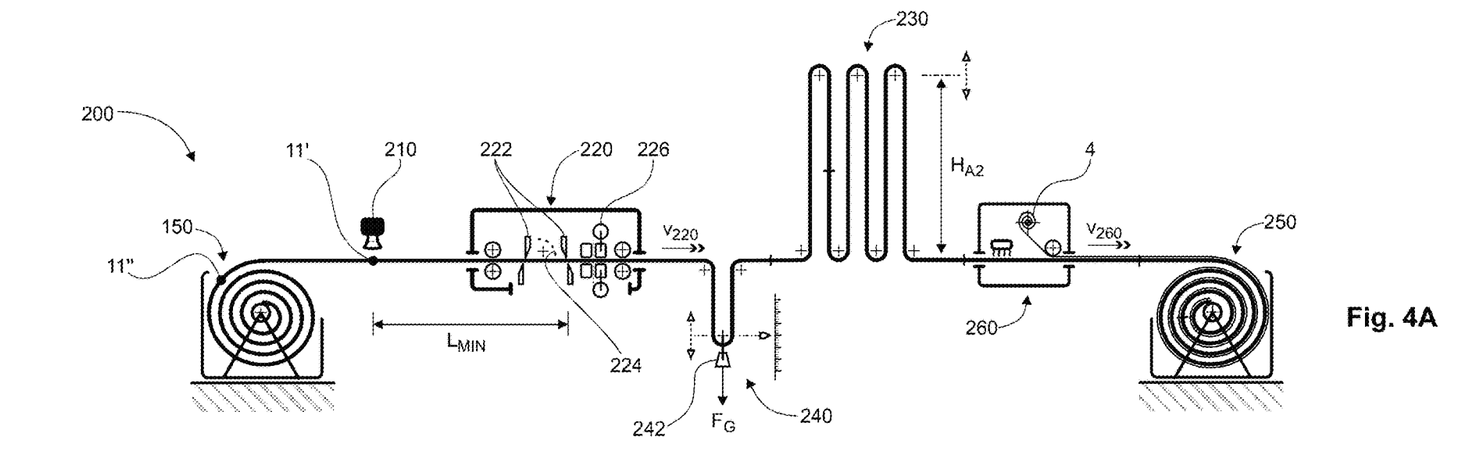
FIGS. 4A-4F different states of a second manufacturing line for performing a second process section.

A defect station 220 is provided at a defined distance $L_{MIN}$ from the detection device 210, through which the profile strand passes at a feed speed $v_{220}$ adapted to the measures carried out in the defect station, which can also be temporarily zero. This defect station is followed by a control device, preferably in the form of a control rocker 240, by means of which it can be detected whether and to what extent the feed speeds differ along the manufacturing line and to what extent the profile strand to be wound onto the supply storage 250, the feed speed $v_{260}$ of which should be kept as constant as possible when passing through an adhesive strip station 260 to ensure good adhesive strip application throughout the profile strand length, must be tracked from the strand accumulator 230. For this purpose, the strand section passing through the control rocker is loaded with the weight force $F_G$ via a weight 242, and the control rocker registers a lifting and or lowering of a deflection or urging upwards or downwards from a set position, which is to be attributed to any local speed differences, which then results in a reduction or increase of the instantaneous height $H_{A2}$ of the strand accumulator 230, since the control system endeavors to keep the control rocker in the set position.

At the end of the second process section, the finished endless profile strand is finally fed to the supply storage 250 to be delivered to the customer. Only this profile strand is free of defects due to the process and only has high quality joints. Furthermore, the profile strand fed to the supply storage has an adhesive strip extending uninterruptedly over a joint and therefore also imparts high structural integrity to the joint. In the following, some of the process steps indicated above are explained separately with reference to individual illustrations of FIGS. 4A-4F.

Figure 4B:
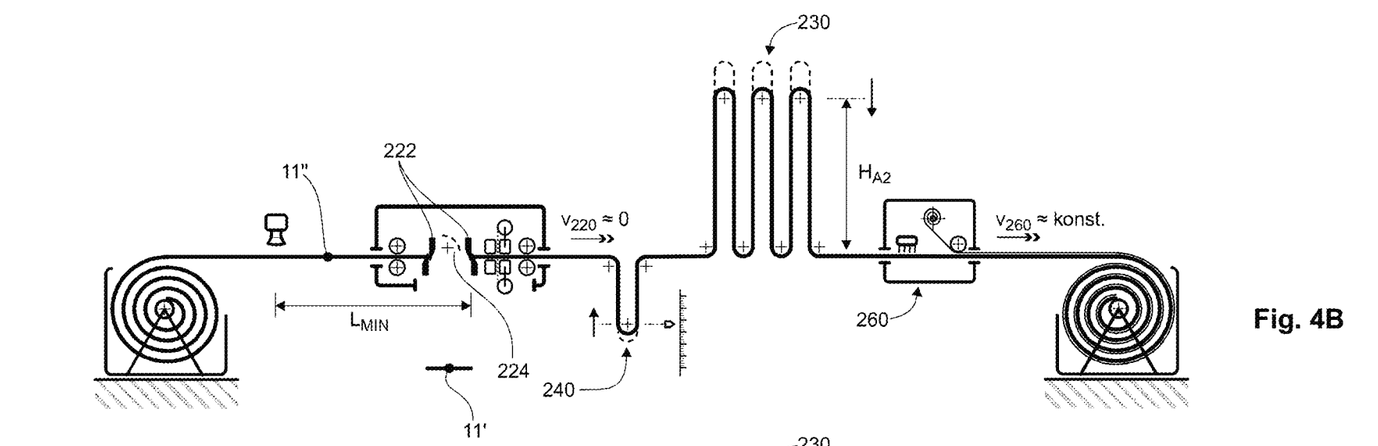

In FIG. 4A, it can be seen that the defect detecting device 210 detects a marked defect 11'. This defect 11' is continued to the separating device 222, which preferably has a distance $L_{MIN}$ from the defect detecting device. The defect 11' is then separated from the profile strand by the separating device 222, as shown in FIG. 4B. The short strand section containing the defect 11' can be disposed of. Since for the separation of the defect 11' the profile strand section located in the area of the separating device 222 and the joining device 226 is temporarily stopped (temporary local feed speed $v_{220}=0$), after the separating end resulting from the separation, which precedes the cut out profile strand section, has been continued in the direction of the joining device 226 (temporary local feed speed $v_{220}$ briefly greater than but close to 0), but the profile strand section passing through the adhesive strip station 260 is preferably kept at a constant local feed speed ($v_{260}$=constant), the two said local feed speeds $v_{220}$ and $v_{260}$ differ. The control rocker 240 registers the local slowing and stopping of the profile strand in front of the control rocker by urging the control rocker deflection upward. To compensate for the speed difference, the height $H_{A2}$ of the strand accumulator 230 is reduced so that local feed speed $V_{260}$ can be kept constant in the gluing strip station 260.

Figure 4C:
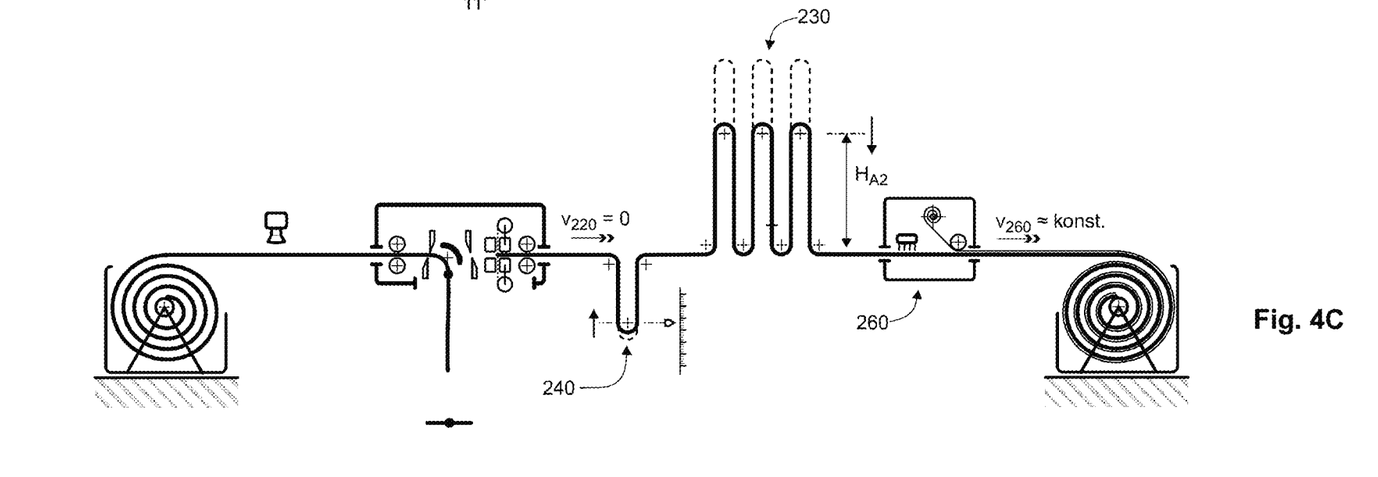

In FIG. 4B it can then be seen that a further marked defect 11" has already passed the defect detection device 210 before the defect 11' has reached the separation device. This means that the second defect 11" follows the leading defect 11' at a distance which is less than the minimum distance $L_{MIN}$ to be maintained between two successive marked defects 11 according to the manufacturer's specifications. This leads to activation of a deflection device 224, via which the profile strand section following the first defect 11' is deflected or diverted from the manufacturing line 200 processing the endless profile strand until the second defect 11" arrives in the area of the separating device and can be detected by the separating device 222 (FIG. 4C). At this point, further profile strand has been removed from the strand accumulator 230 to continue feeding profile strand at a constant rate $v_{260}$ to the adhesive strip station 260 and the downstream supply storage. Deflection of the control rocker continues to push upwards. The height $H_{A2}$ in FIG. 4C is therefore further reduced compared to the height shown in FIG. 4B.

Figure 4D:
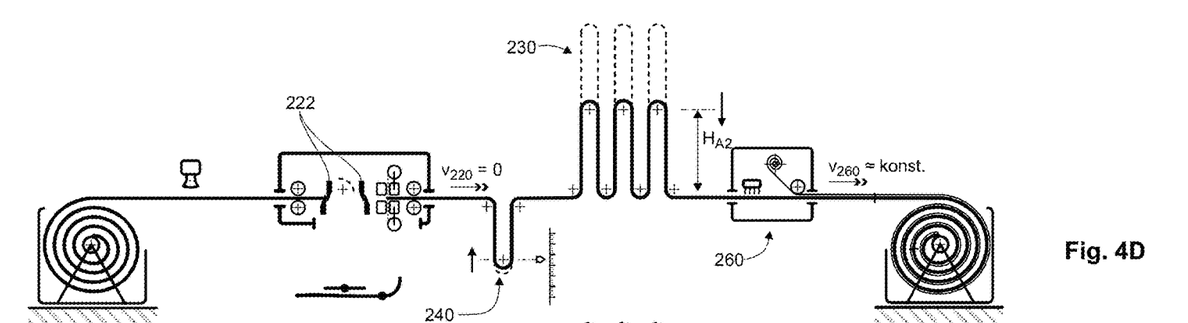

In FIG. 4D, the profile strand section containing the defect 11" is cut out by activating the separating device 222 and can be disposed of. The deflecting device 224 is deactivated because the detecting device 210 has not detected another marked defect in the area of the minimum distance $L_{MIN}$. The strand profile fed to the adhesive strip station 260 is still removed from the strand accumulator 230 and its height $H_{A2}$ is further reduced.

Figure 4E:
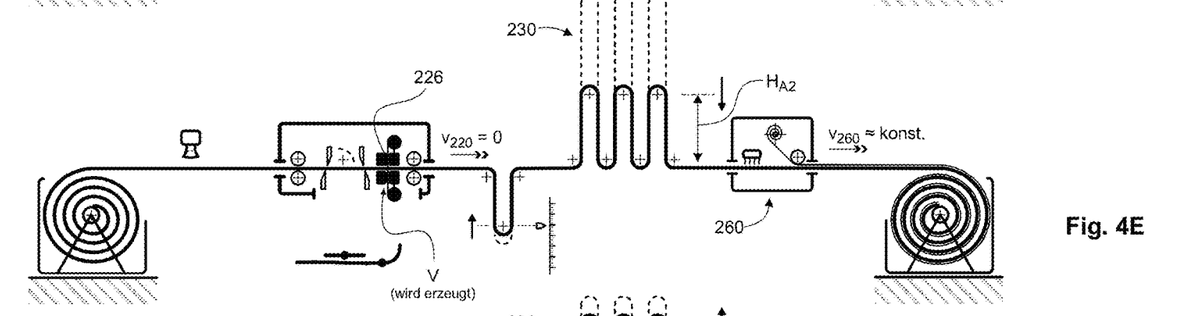

In FIG. 4E, it can be seen how the separating end following the cut-out strand section is fed in the feed direction to the now activated joining device 226 and the two separating ends are joined to form a joint V (FIG. 2) in a manner known to the skilled person, while the strand profile fed to the adhesive strip station 260 is still taken from the strand accumulator 230.

Figure 4F:
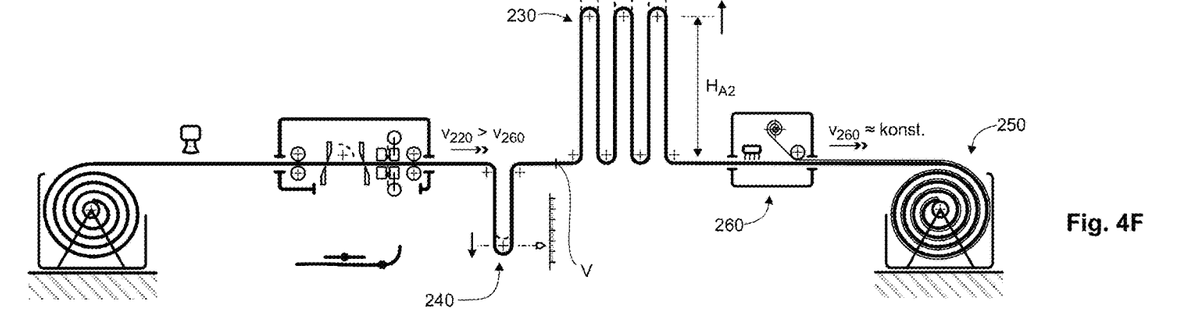

Finally, FIG. 4F shows how the manufacturing line is returned to the state shown in FIG. 4A after cutting out a defective section of the extruded profile. Cutting device 222, deflection device 224 and joining device 226 are deactivated. The previously generated joint V has in the meantime passed the control rocker, whose deflection now reacts with a downward yielding due to the control of the feed speed $v_{220}$ to a value greater than $v_{260}$, which is counteracted by increasing the height $H_{A2}$ of the strand accumulator 230 while keeping the feed speed $v_{260}$ constant, so that the strand accumulator 230 can be filled again.

Figure 2:
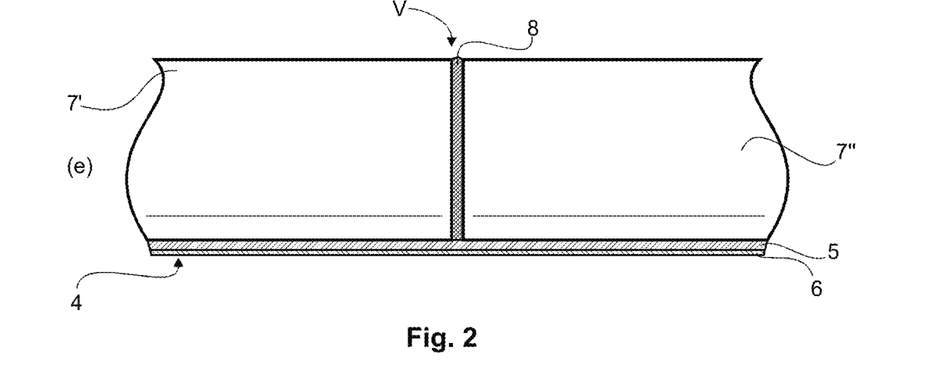
FIG. 2: a profile strand having a joint and provided with an adhesive strip.

At the end of the second process section, the supply storage 250 is filled with an endless profile strand which—in accordance with the vehicle manufacturer's specifications—is free of defects and has joints of the highest quality over which an adhesive strip extends without interruption as shown in FIG. 2.

The process sequence described in FIG. 3 and FIGS. 4A-4E and the allocation of individual process steps to the first or second process section or to the first or second manufacturing line can of course vary in individual cases.

In particular, it can be provided that instead of or in addition to the specification of a minimum distance $L_{MIN}$ between successive flaws, a maximum number of flaws $Z_{MAX}$ in relation to a specific profile strand length is also or additionally used.

LIST OF REFERENCE SIGNS

1 Profile strand
2 first material area
3 second material area
4 Adhesive strip
5 Adhesive layer
6 Liner
7'/7" first/second separating end
8 Joining compound
9 metallic foil/mass mixed with metal particles
10 defects
11 marked defects
100 first manufacturing line
102 Microwave
104 Spray cooling
106 Drying
108 Lacquering device
110 Lacquer drying
120 Inspection device
122 Camera
124 Marking device
130 First strand accumulator
150 Intermediate storage
200 second manufacturing line
210 Detecting device
220 Defect station
222 Separating device
224 Deflection device
226 Joining device
230 Second strand accumulator
240 Control rocker
242 Control rocker weight
250 Supply storage
260 Adhesive strip station
V Joint
A Receiving channel
S Feed direction
$H_{A1}$ variable height of the first strand accumulator
$H_{A2}$ variable height of the second strand accumulator
$L_{MIN}$
$F_G$ weight force acting on the control rocker arm
$V_{220}$ local feed speed
$V_{260}$ local feed speed

The invention claimed is:

1. A method for processing a profile strand, comprising:
feeding the profile strand to an intermediate storage during a first process section;
removing the profile strand from the intermediate storage during a second process section that is downstream of the first process section; and
then feeding the profile strand to a supply storage;
wherein the second process section includes cutting one or more defects out of the profile strand, and then one or both of (a) rejoining ends of the profile strand created by cutting out the one or more defects to form one or more joints, or (b) applying an adhesive strip to the profile strand over ends of the profile strand created by cutting out the one or more defects to form the one or more joints, and
wherein a temperature of the profile strand when the profile strand is removed from the intermediate storage at the beginning of the second process section is at least 50% lower than a temperature of the profile strand at which the profile strand is fed to the intermediate storage at the end of the first process section.

2. The method of claim 1, wherein the second process section performed on a second manufacturing line is performed temporally downstream of the first process section and independently of the first process section.

3. The method of claim 1, wherein the profile strand is fed to the intermediate storage before cutting out the defects or applying the adhesive strip.

4. The method of claim 1, further comprising, during the first process section, marking the one or more defects with defect markings on the profile strand, and in the second process section, identifying the one or more defects marked in the first process section by a detection device on the basis of the defect markings made in the first process section.

5. The method of claim 4, further comprising, in the second process section, separating the one or more defects identified by the detecting device out of the profile strand with a separating device, and rejoining ends of the profile strand created by cutting out the one or more defects with a joining device to form the one or more joints.

6. The method of claim 1, wherein at least twenty-four hours elapse between carrying out the first process section and carrying out the second process section with the intermediate storage.

7. The method of claim 1, wherein, in the second process section, one of the ends of the profile strand created by cutting out the one or more defects is a lagging end with respect to a feed direction, and the lagging end is fed in the feed direction to a joining device for subsequent joining one of the ends that is a leading end with respect to the feed direction for producing one of the one or more joints.

8. The method of method of claim 7, wherein, in the second process section, an adhesive strip station for applying an adhesive strip applies the adhesive strip without interruption over a previously created one of the one or more joints.

9. The method of claim 1, wherein the second process section further includes at least one of (a) monitoring to ensure a minimum distance $L_{MIN}$ between joints or (b) monitoring to ensure a length-related maximum number of joints $Z_{MAX}$.

10. A method for processing a profile strand, comprising:
feeding the profile strand to an intermediate storage during a first process section;
removing the profile strand from the intermediate storage during a second process section that is downstream of the first process section; and
then feeding the profile strand to a supply storage;
wherein the second process section includes cutting one or more defects out of the profile strand, and then one or both of (a) rejoining ends of the profile strand created by cutting out the one or more defects to form one or more joints, or (b) applying an adhesive strip to the profile strand over ends of the profile strand created by cutting out the one or more defects to form the one or more joints,
wherein, in the second process section, one of the ends of the profile strand created by cutting out the one or more defects is a lagging end with respect to a feed direction, and the lagging end is fed in the feed direction to a joining device for subsequent joining one of the ends that is a leading end with respect to the feed direction for producing one of the one or more joints, and
wherein, in the second process section, an adhesive strip station applies the adhesive strip without interruption over a previously created one of the one or more joints.

* * * * *